June 12, 1951     L. H. BROWNE     2,556,359
SPEED REDUCER

Filed Nov. 12, 1947            8 Sheets-Sheet 1

INVENTOR
LINDSAY H. BROWNE
BY
ATTORNEYS

June 12, 1951 L. H. BROWNE 2,556,359
SPEED REDUCER
Filed Nov. 12, 1947 8 Sheets-Sheet 2

INVENTOR
LINDSAY H. BROWNE
BY
Van Deventer + Grier
ATTORNEYS

June 12, 1951 L. H. BROWNE 2,556,359
SPEED REDUCER
Filed Nov. 12, 1947 8 Sheets-Sheet 4

INVENTOR.
LINDSAY H. BROWNE
BY VanDeventer & Grier
ATTORNEYS

June 12, 1951  L. H. BROWNE  2,556,359
SPEED REDUCER

Filed Nov. 12, 1947  8 Sheets-Sheet 5

INVENTOR.
LINDSAY H. BROWNE
BY
*Van Deventer & Grier*
ATTORNEYS

June 12, 1951  L. H. BROWNE  2,556,359
SPEED REDUCER
Filed Nov. 12, 1947  8 Sheets-Sheet 6

INVENTOR
LINDSAY H. BROWNE
BY
Van Deventer & Grier
ATTORNEYS

June 12, 1951        L. H. BROWNE        2,556,359
SPEED REDUCER Filed Nov. 12, 1947              8 Sheets-Sheet 8

INVENTOR.
LINDSAY H. BROWNE
BY
Van Deventer + Grier
ATTORNEYS

UNITED STATES PATENT OFFICE 2,556,359

SPEED REDUCER

Lindsay H. Browne, Westport, Conn., assignor to American Brake Shoe Company, a corporation of Delaware Application November 12, 1947, Serial No. 785,403

24 Claims. (Cl. 74—199)

This application relates to improvements in speed reducers, and has for an object the provision of a novel speed reducing mechanism of marked effectiveness.

A feature of the invention comprises the provision of input and output members rotatable about different axes and having surfaces in frictional driving engagement with one another at positions variable with respect to the radial distances from the respective axes, together with means for flexing one of said members to move the location of frictional engagement and thereby vary said radial distances.

The member which is flexed may comprise a disc of flexible metal or other suitable material, connected to an output shaft and frictionally engaging a surface rotated about a given axis by an input shaft. By flexing said disc with respect to said surface, the position of frictional engagement is shifted with respect to said axis, and the desired speed reduction obtained with ease and precision.

More specifically, an illustrative embodiment of the invention may comprise a shaft adapted to be driven by a prime mover, said shaft carrying a member having a curvilinear surface; and second shaft carrying a flexible disc contacting said surface, and means to flex the disc to vary the angular displacement of the point of contact between it and said surface with respect to the axis of the first shaft, thereby causing the second shaft to rotate at a speed substantially less than the speed of the first shaft.

Another more specific feature of the invention may comprise a flexible disc carried by a shaft, said flexible member contacting a curvilinear surface rotated by another shaft driven by a prime mover, and means for varying the point of contact of said flexible disc with said curvilinear surface from a point lying on the axis of said last mentioned shaft to a point angularly displaced from said axis to a substantial degree, whereby the rate of speed of said first mentioned shaft may be varied from zero to a plurality of revolutions.

An example of simple form of the device contemplates the provision of a plurality of shafts belted or otherwise operatively connected to a shaft which is driven by a prime mover; for example, three such shafts may carry pulleys of equal diameters and a fourth shaft driven by a prime mover such as an electric motor may carry a pulley of like diameter, and a single belt may span all of these pulleys so as to rotate the first three mentioned shafts at the same speed as that of the drive shaft. The third shaft which is in vertical alignment with the drive shaft may be made adjustable so that the belt can be tightened, and the two shafts which lie on a plane making an angle of 90 degrees with the plane passing through the drive shaft, and the belt tightener shaft, are equi-distant from a central point. They have sockets formed in each end thereof, and positioned in these sockets are balls. A central shaft, parallel to the other shafts and having its center line extending through said central point, which is the shaft to be driven at reduced speed, consequently has its axis equi-distant from the axes of the two shafts which carry the sockets and balls. This shaft, termed the driven shaft, carries a disc which contacts the balls in the sockets in corresponding ends of the socketed shafts. A second disc is carried by the driven shaft and it contacts the balls in the other ends of the socketed shafts. Means is provided for urging the hubs of the two discs towards each other axially, thereby flexing both discs equally. Assuming that the discs normally contact the balls on the axes of the socketed shafts, flexing the discs by urging the hubs towards each other causes the points of contact of the discs with the balls to move angularly from the axes of the socketed shafts, and the more the discs are flexed the more this angle is increased and, consequently, the faster the shaft carrying the discs will be rotated. Due to the ratio of the radii involved the shaft carrying the disc will rotate at comparatively few revolutions per minute, even though the socketed shafts are rotating at a high rate of speed.

Yet another object of the invention is the provision in a speed reducer of the character described, of torque compensating means cooperating with said flexible discs to increase the normal torque between the disc and the balls as the flexure of the disc is reduced, and particularly as it approaches zero, thereby resulting in greater torque as the speed is reduced toward zero speed.

Another object of the invention is the provision in speed reducers of the character described, of flexible discs comprised of a plurality of laminations.

Other objects and advantages of the invention will be apparent to those skilled in the art upon a study of the following specification, and the accompanying drawings.

Referring to the drawings:

Figure 5 is a sectional elevation taken on a plane 90 degrees with respect to the plane on which Figure 4 is taken, this plane being indicated by the lines 5—5 of Figure 2;

Figures 1, 2, 3:
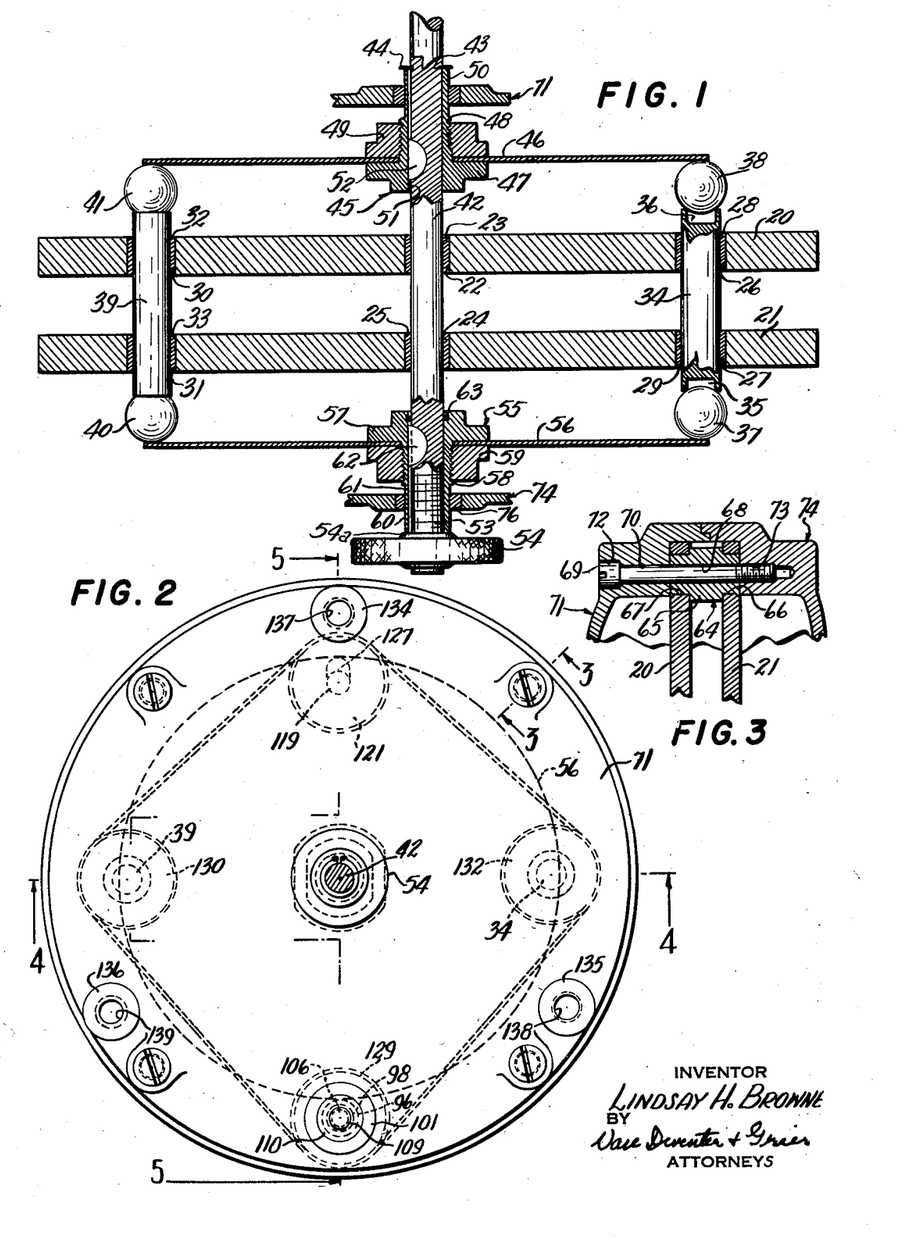
Figure 1 is a sectional view, somewhat diagrammatic, of one form of my new and improved speed reducer.
Figure 2 is a plan view of my new and improved speed reducer showing the resolution of the driven shaft, the two ball carrying shafts driven in unison, the shaft driven by the prime mover, and the belt tightening pulley for adjusting the tension of the belt.
Figure 3 is a sectional view taken along the line 3—3 of Figure 2.

Referring first to Figure 1, a pair of supporting plates 20, 21 are held in spaced relation to each other in a manner to be presently described. These plates are in the form of discs, and the plate 20 has a central hole 22 formed therein into which is pressed a bearing bushing 23. In the plate 21, in alignment with the hole 22, is a central hole 24 into which is pressed a bearing bushing 25.

The plate 20 has a hole 26 formed therein and the center of this hole is in alignment with, and is a predetermined distance from the center of the hole 22. A similar hole 27 is formed in the plate 21 in alignment with the hole 26. The holes 26 and 27 are provided respectively with bearing bushings 28 and 29.

Also formed in the plate 20 is a hole 30 the center of which is in alignment with the center of the hole 22 and is the same distance therefrom as the center of the hole 26 is, with the result that the holes 26, 22, and 30 are in alignment on a plane cutting the axes of all of them.

The plate 21 has a hole 31 in alignment with the hole 30, and the holes 30 and 31 are provided respectively with bearing bushings 32, 33.

A shaft 34, having a cup-like depression 35 formed in one end thereof, and a second cup-like depression 36 formed in the other end thereof, is journaled in the bearings 28 and 29, and positioned in the cup-like depressions 35 and 36 respectively, are hardened steel balls 37, 38. These balls are retained in the cup-like sockets by means of discs to be presently described. A second shaft 39 which is identical with the shaft 34 is journaled in the bearings 32 and 33 and has positioned in its cup-like depressions, shown in Figure 4 as 40a and 41a, hardened steel balls 40 and 41 respectively.

Journaled in the bearings 23, 25, is a shaft 42 which has an annular groove 43 formed therein in which is positioned a snap ring 44.

A hub member 45 has a flange portion 47 against which is shouldered a flexible disc 46. The hub has a threaded shank portion 48 the threads of which are engaged by corresponding threads formed in a collar member 49 permitting the disc to be tightly clamped between it and the flange 47. The shank of the hub has an extension 50, the end of which bears against the snap ring 44. The hub has a longitudinal keyway 51 which engages a Woodruff key 52 set into the shaft 42. The shaft 42 has its other end 53 threaded and a knurled knob 54 has a threaded hole therein which engages the threads 53. The function of this knob will presently be described.

A hub member 55 has a flange portion 57 against which is shouldered a flexible disc 56. The hub has a threaded shank portion 58 the threads of which are engaged by corresponding threads formed in a collar member 59 permitting the disc to be tightly clamped between it and the flange 57. The shank of the hub has an extension 60, the end of which bears against the hub 54a of the knob 54. The hub has a longitudinal keyway 61 which engages a Woodruff key 62 set into the shaft 42. The hub member 55 has an annular groove formed in its interior bore to accommodate a packing ring 63.

*Principle of operation*

The shafts 34 and 39 are rotated at substantially the same rate of speed. Consequently the balls 37 and 38 carried by the shaft 34, and the balls 40 and 41 carried by the shaft 39 all rotate at substantially the same speed. The disc 46 retains the balls 38 and 41 in their sockets, and likewise the disc 56 retains the balls 37 and 40 in their sockets. Normally (when the discs are exerting no pressure upon the balls, or at least a minimum pressure on the balls), the points of contact between the discs and the balls lies in line with the axes of the shafts 34 and 39, and although both of these shafts and the balls carried thereby are rotating at a particularly high speed there is no rotative urge imparted to the discs 46 and 56 and, consequently, there is no rotative urge imparted to the shaft 42.

Figure 4:
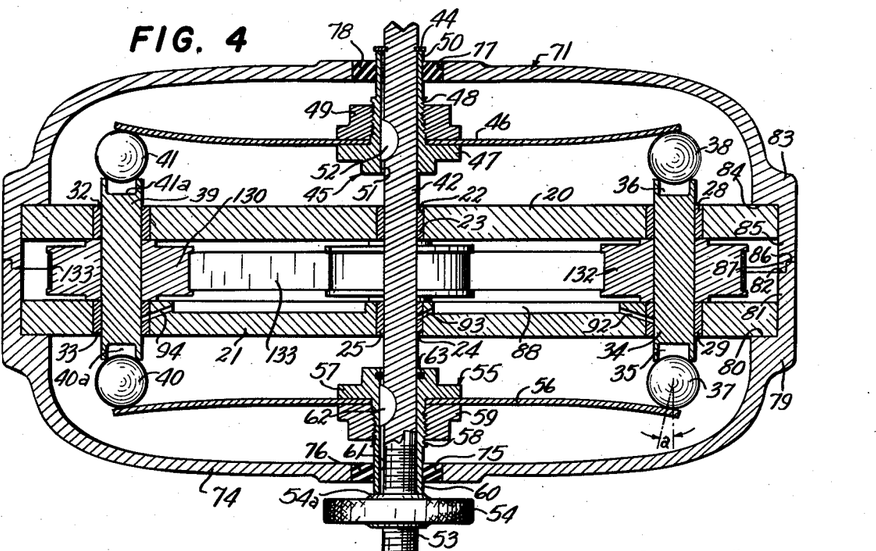
Figure 4 is a sectional elevation taken along the lines 4—4 of Figure 2.

Now, when the knob 54 is rotated on the shaft 42, it follows the threads 53 and actually shortens the distance between its flange 54a and the snap ring 44. In shortening this distance, due to the fact that it bears against the end of the hub portion 60, the hubs and, consequently, the discs carried thereby are forced toward each other. Now, since the outer edges of the discs which are in contact with the balls cannot move toward each other due to the presence of the balls and the shaft between them, forcing the hubs toward each other causes the discs to flex, an example of which is shown in Figure 4. In Figure 4, it will be noted that a line extending from the center of the ball 37 through the point of tangency of the disc 56 with the ball 37 forms an angle $a$ with the axis of the shaft 34, so that the ball 37 causes the disc 56 to rotate. The same displacement of the point of tangency between the disc 56, and the ball 40, obtains, and likewise the same displacement of the point of tangency between the disc 46 and the balls 38, and 41, also obtains, with the result that all four balls exert substantially the same rotative urge upon the discs in which they are in contact and, therefore, the shaft 42 is rotated thereby.

The speed of rotation of the shaft 42 is very slow compared to the speed of the shafts 34 and 39, and this is due to the fact that the radii of the discs to the points of tangency with the balls is many times the length from the axis of the shafts 34 and 39 to said points of tangency. The greater the flexure of the discs, the greater the angular displacement of the points of contact and, consequently, the faster the shaft 42 is rotated, and the limit of the maximum speed of the shaft 42 obtainable depends upon how much flexure the disc will stand. I have found it preferable to form the discs of tempered steel which has been hardened and ground and in cases where extremely accurate speed regulation is necessary it helps to lap the discs after they have been hardened and ground.

From the above it will be seen that my new and improved speed reducer may be very easily regulated from zero rotation of the shaft 42 to the speed imparted to it by the discs when the latter are flexed a maximum by merely rotating the knurled knob 54 in one direction to increase the speed and in the opposite direction to decrease it.

Having explained above the principle of the invention, reference is made to Figures 1 to 5 which illustrate a form of my new and improved speed reducer which is particularly adapted for driving turntables for recording phonograph records, electrical transcriptions, etc.

The plates 20 and 21 above described are secured together in definite spaced relation, for example, by means of a plurality of bushings (four in the embodiment shown in Figures 2 to 5 inclusive) one of which is shown in Figure 3, and designated by the numeral 64. The bushing 64 has a central portion 65 with stepped extensions thereof, 66 and 67, which are smaller in diameter than the body portion 65, thereby forming shoulders. The extensions 66 and 67 are pressed into corresponding holes formed in the plates 20 and 21, and the outer edges are peened over to permanently retain the bushing 64 therein, and due to the fact that the portion 65 has its ends terminating in shoulders against which the plates 20 and 21 are forced, these plates are rigidly retained in parallel relation.

The bushing 64 has a central hole 68 therein through which a filister head screw 69 extends. The screw 69 passes through a clearance hole 70 formed in a housing member 71, and the outer end of this clearance hole communicates with a counterbored hole 72. The threaded end of the screw engages a correspondingly threaded hole 73 formed in a housing member 74. The housing 74 is cupped downwardly, as may be seen in Figures 4 and 5, and is provided with a central hole 75 containing a rubber-like gasket 76 which has a central hole therein which forms a sealing contact with the sleeve member 60. The gasket 76 may be made, for example, of artificial rubber which will not be affected by oil employed within the housing for lubricating the moving parts of the device.

Figure 5:
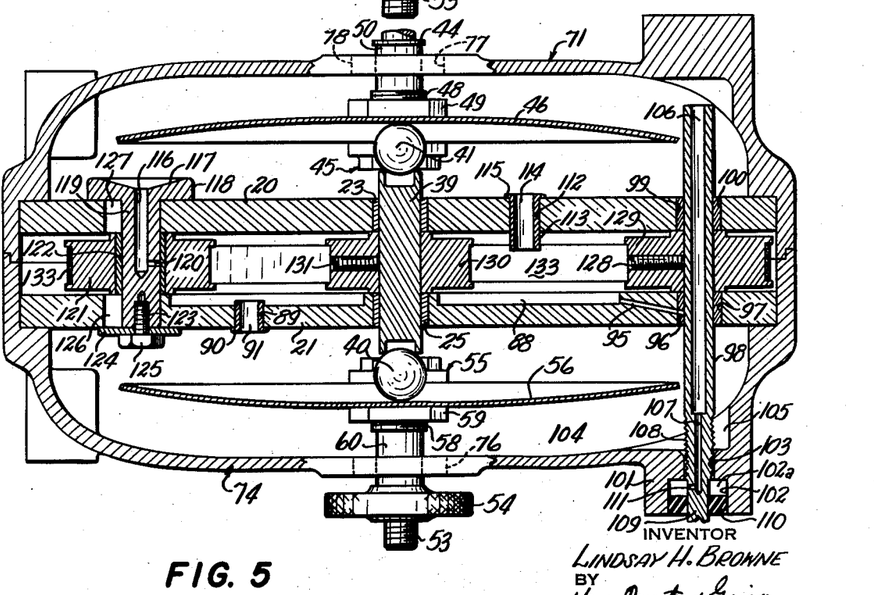

The housing 71 is cupped upwardly and has a central hole 77 formed therein and this hole contains a disc-like gasket 78 which forms a fluid tight fit with the sleeve portion 50. The housing 74 has an annular rim 79 which is counterbored to form an annular shoulder 80, thereby leaving an annular web 81, and this annular web is counterbored to form an annular shoulder 82.

The housing member 71 has an annular rim 83 which is counterbored to form a shoulder 84 thereby leaving an annular web 85, and this web is stepped to form an annular shoulder 86, and an annular tongue 87.

The structure composed of the plates 20 and 21 secured together with the four bushings 64 is positioned in the housing 74 so that the plate 21 rests against the annular shoulder 80 (Figure 4), then the housing 71 is positioned on the structure so that the shoulder 84 rests against the upper surface of the plate 20; at the same time the tongue portion 87 of the housing 71 rests against the shoulder 82, and the shoulder 86 rests against the remaining portion of the web 81 so that the housing 74 and the housing 71 are tightly clamped together with the structure 20, 21, therebetween.

The plate 21 has an annular cavity 88 formed therein which is adapted to catch oil (in a manner to be presently described), for lubricating all of the bearings carried in the plate 21, and formed in the plate 21 is a hole 89 which has pressed into it a shouldered bushing 90 having a hole 91 therethrough. It will be noted that the length of the bushing projecting into the cavity 88 is equal to about half of the depth of the cavity 88. The purpose of this bushing is to maintain in the cavity 88 an oil level which is subtantially half of the depth of the cavity.

In Figure 4, an oil hole 92 extends angularly from the bottom of the cavity through the wall of the bushing 29 so as to supply oil to the shaft 34 where it is journaled in the bushing 29. Extending from the bottom of the cavity 88 is an angular hole 93 which extends through the bushing 25 so as to supply oil to the shaft 42 where it is journaled in the bushing 25. An angular oil hole 94 extends from the bottom of the cavity 88 through the bushing 33 so as to supply oil to the shaft 39 where it is journaled in the bushing 33.

Referring now to Figure 5, an annular oil hole 95 extends from the bottom of the cavity 88 through a bearing bushing 96 which is pressed into a hole 97 formed in the plate 21, and a vertical shaft 98 is journaled in the bushing 96 and is lubricated via the oil hole 95. Formed in the plate 20, in alignment with the hole 97, is a hole 99 which has pressed into it a bearing bushing 100. The shaft 98 is also journaled in the bushing 100.

Formed integral with the housing 74 is a depending boss 101 which has a hole 102 formed therein. A second hole 103, concentric with the hole 102, communicates with both the hole 102 and the interior chamber 104 in the housing 74, via a cavity 105.

The shaft 98 has extending into it, from the upper end thereof, a passage 106, and communicating with the passage 106 is a smaller passage 107. The shaft 98 carries external threads 108, the outer diameter of which is one or two thousandths of an inch smaller than the diameter of the hole 103. The shaft 98 has an extension 109 of smaller diameter which may be connected to a prime mover, such as an electric motor, for example.

A gasket 110, having a hole therein which forms a working fit on the shaft extension 109, is pressed into the hole 102, and the remainder of the hole 102 above it forms an oil chamber 102a. A cross passage 111 communicates with the oil chamber 102a and with the passage 107 formed in the shaft 98 so that with oil in the chamber 104, and with the shaft extension 109 being rotated by the prime mover as aforesaid, the threads 108 force oil from the chamber 104 downwardly into the chamber 102a. As oil fills the chamber 102, and develops pressure, it flows via the passage 111, and the passage 107, into the passage 106, and overflows from the upper end of the shaft 98 onto the upper surface of the plate 20. The plate 20 has a hole 112 into which is forced a shouldered bushing 113 having a hole 114 therein. The head 115 of this bushing is of a thickness substantially equal to the level of oil desired on the upper surface of the plate 20, so that when the oil tends to rise above the level of the head 115 of the bushing, it flows through the hole 114 and passes down into the cavity 88 formed in the plate 21. Some of the oil delivered via the passage 106 is picked up by the disc 46 and is splashed within the interior of the two housings and, consequently, the balls are lubricated, and also some lubrication enters into a passage 116 via a conical cavity 117 formed in the head 118, of a shaft 119. A cross passage 120, formed in the shaft 119, communicates with the passage 116.

A pulley 121 carries a bushing 122 which journals on the shaft 119 so that some of the oil splashed by the disc 46, as described above, is caught in the conical cavity 117 and is delivered to the interior of the bushing 122 via the passages 116 and 120. The shaft 119 has an axial threaded hole which is engaged by a screw 123, and a washer 124 on this screw is clamped against the bottom of the surface of the plate 21 when the head 125, of the screw 123, is moved in a direction to tighten the screw. The shaft 119 extends through an elongated or slotted hole 126 formed in the plate 21, and through a slotted hole 127 formed in the plate 20. The pulley 121 is shown as having outer flanges thereon and adapted to utilize a flat belt. This is merely given by way of example, because, obviously a round belt, a V-shaped belt, or any other peculiar form of belt may be used, in which event the pulley would be formed accordingly.

The shaft 98 has secured thereto, by means of a set screw 128, a pulley 129, which is preferably identical in diameter and width with the pulley 121. The shaft 39 has secured to it, by means of a set screw 131, a pulley 130, and the shaft 34 has secured to it a pulley 132 in the same manner.

The four pulleys 121, 129, 130, and 132, are of identically the same diameters and these pulleys are spanned by a single, endless, flat belt 133, so that as the motor rotates the shaft extension 109, the shaft 98, which is integral therewith, is rotated, and with it the pulley 129 is rotated, and the belt causes the other three pulleys, 121, 130, and 132, to rotate in unison therewith.

When the device is initially assembled, the nut 125 is turned to loosen the screw 123 following which the person who assembles the device may move the shaft to the left as seen in Figure 5, in order to properly tighten the belt and, holding the shaft in the proper position he may, by means of the head 125, tighten the screw 123, thus retaining the washer 124 and the head 118 against the structure to retain the shaft 119 in the adjusted position.

The housing member 71 has formed integral therewith, round bosses 134, 135, and 136, which have formed therein tapped holes 137, 138, and 139 respectively. These bosses are provided for mounting the device. For example, where the device is used for driving records for cutting, or other electrical transcriptions, etc., the mechanism may be mounted below the table and the turntable may be mounted on the upper end of the shaft 42 above the table on which the device is operated.

Now, as described above, in connection with the principle employed in the device, the motor may be started up thus driving the shaft 98 via its extension 109, and thereby causing the shafts 34 and 39 to rotate. The balls 37 and 38, carried by the shaft 34, and the balls 40 and 41 carried by the shaft 39, rotate therewith. With the discs in the positions shown in Figure 1, they contact the rotating balls on their axes, but if the operator turns the knurled knob 54 in the right hand, or clockwise direction, as viewed from the bottom, the hubs 45 and 55 are urged toward each other and the discs 46 and 56 will be flexed equally and, thereby, their points of contact with the balls are shifted angularly and, thereby, the discs are rotated and, with suitable gages, stroboscopic discs, tachometers, etc., the knob 54 may be adjusted to obtain an accurate and exact speed; and, since all working parts of the device are thoroughly lubricated by the oiling arrangement described above, the device should give continuous, accurate, and long service.

Figure 6:
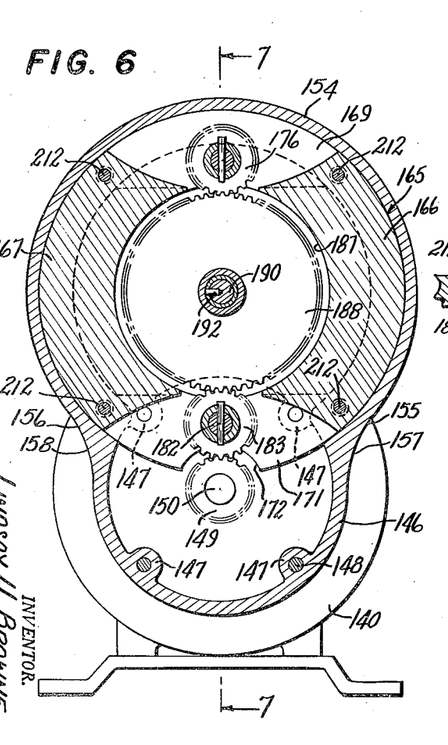
Figure 6 is an elevation view partly in section of a modification of the invention wherein the disc driving shafts have rounded ends instead of carrying balls, and in which said shafts are driven in unison by means of pinions carried on the shaft and meshed with a gear therebetween.
Figures 7, 8:
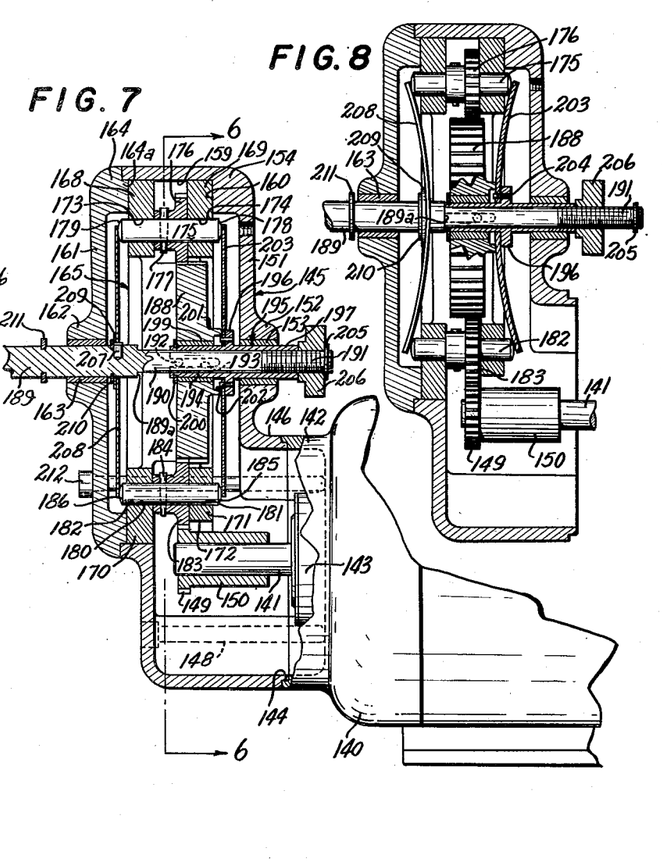
Figure 7 is a sectional elevation taken along the lines 7—7 of Figure 6.
Figure 8 is a view similar to Figure 7 except that the discs are shown as having been urged toward each other and are in a flexed state.

Referring now to Figures 6, 7, and 8, a modified form of the invention is shown wherein an electric motor 140 has a shaft 141 which extends through a bearing boss 142 carrying a bearing 143. The bearing boss has a counterbore 144 formed therein. A main casting 145 has a tubular portion 146 the end of which is stepped and engages the counterbore 144 to accurately locate the casting 145 on the motor boss 142. The casting carries a plurality of lugs 147 through which screws 148 pass to threadedly engage tapped holes formed in the motor boss 142.

A pinion 149, having a hub 150, is keyed to the motor shaft 141. The casting 145 has a body portion which includes a web 151, which is formed integral with the tubular portion 146, and with a bearing boss 152 carrying a bearing bushing 153. The web 151 terminates in an annular rim 154 which extends from the point 155 to the point 156, as may be seen in Figure 6, and from these points the rim planes, by means of fillets 157 and 158, with the walls of the tubular portion 146. The rim 154 has a counterbore 159 which terminates on a shoulder 160. A matching cover plate has a web 161, a central bearing boss 162 with a bearing bushing 163 therein. The web 161 terminates in an annular rim or boss 164 which is stepped to form a boss 164a which fits the counterbore 159, thus the bearing bushing 163 is aligned with the bearing bushing 153.

A frame member, generally designated by the numeral 165, has spaced webs 166 and 167 which are joined at the top by extensions 168, and 169, and are joined at the bottom by extensions 170 and 171. In Figure 6, the extension 169, at the top, may be seen, and also the extension 171 is seen, and it will be noted that this extension has a portion cut away leaving an arcuate surface 172 which clears the hub 150.

Formed in the extensions 168 and 169, are aligned bearing holes 173 and 174, and journaled in these holes is a shaft 175 which has mounted thereon a pinion 176 which is keyed to the shaft 175 by means of a taper pin 177 which passes through the hub of the pinion 176 and the shaft 175. The shaft 175 has a rounded surface 178 formed on one end thereof, and a like rounded surface 179 formed on the other end thereof. These surfaces may conform to any desired predetermined curve within the limits of the material.

The extension 170 has a bearing hole 180 formed therein, and in alignment therewith is a second bearing hole 181 formed in the extension 171. A shaft 182 is journaled in these bearing holes and has mounted thereon a pinion 183 which is keyed to the shaft by means of a taper pin 184 passing through both the hub of the pinion 183 and the shaft 182. The shaft 182 has a rounded surface 185 formed on one end thereof and a like rounded surface 186 formed on the other end thereof. These surfaces are exactly like the surfaces 178 and 179, on the ends of the shaft 175.

The frame member 165 has a central circular passage 187 formed therein which clears a gear 188 which meshes with the pinions 176 and 183. The gear 188, meshing with pinion 183, which is driven by the pinion 149, causes pinion 176 to rotate in unison with pinion 183 both as to direction and as to speed.

A shaft 189 has formed integral therewith a portion 190 of reduced diameter, the right end of which, as seen in Figure 7, has threads 191 formed thereon. The shaft has a pin 192 extending therefrom and this pin engages a slot 193 formed in the end 194 of a sleeve member 195. The sleeve member has an intermediate flange 196 formed integral therewith, and a straight portion 197 to the right of the flange, as seen in Figure 7, is journaled in the bearing 153.

The gear 188 has a bearing bushing 199 which is journaled on the sleeve portion 194. A snap ring 200, which is snapped into a groove formed in the sleeve portion 194, retains the gear 188 on the sleeve 194. The gear 188 has a hub portion 201 which has a counterbore 202 formed therein and thus the hub 201 presents an annular face in contact with a flexible disc member 203 which is secured to the flange 196 by means of rivets 204.

The shaft portion 190 has a snap ring 205 snapped into a corresponding groove adjacent to the right end, as seen in Figure 7, or 8, and this snap ring retains a knurled knob 206 which has internal threads engaging the threads 191.

The shaft 189 has a radial pin 207 which engages a corresponding slot in, and forms a driving key for, a second flexible disc 208. A washer 209 bears against the left face of the disc 208 and is held in this position by means of a snap ring 210 which is snapped into a groove formed in the shaft 189. The shaft 189 is journaled in the bearing 163. Spaced apart from the bearing 163 is a snap ring 211 which engages a groove in the shaft 189 and limits the movement of the shaft to the right, as seen in Figures 7 and 8.

When the discs 203 and 208 are in their neutral positions they are not flexed and, consequently, they contact the curved surfaces on the ends of the shafts 175 and 182 at points on the axes of the shafts. Consequently, no rotative urge is imparted to the discs and, consequently, the shaft 189 is at rest; that is to say, it has zero rotation.

Now when the knob 206 is rotated in a clockwise direction, as viewed from the right end of Figure 7, or 8, (the threads 191 being right hand threads), the sleeve member 195 is forced toward the left and the reaction moves the shaft toward the right and thus both the disc 203 and the disc 208 are flexed equally. As a result of this the points of contact between the discs and the curved ends of the shafts 175 and 182 are displaced angularly and the discs are rotated, and the shaft 189 rotates with the discs. As the discs are flexed a greater and greater degree by urging the hubs thereof toward end other, the gear 188 is advanced axially within the clearance space 187, and the limit of such advancement is the point where the left end of the sleeve portion 184 abuts the shoulder 189a at the right end of the shaft portion 189.

The cover plate and the frame 165 are secured to the main body or casting by means of screws 212 which pass through clearance holes in the frame 165 and engage correspondingly threaded holes in the rim portion 154, and thus the frame member 165 is positively clamped between the surface 160 and the surface of the boss 164a.

Figure 9:
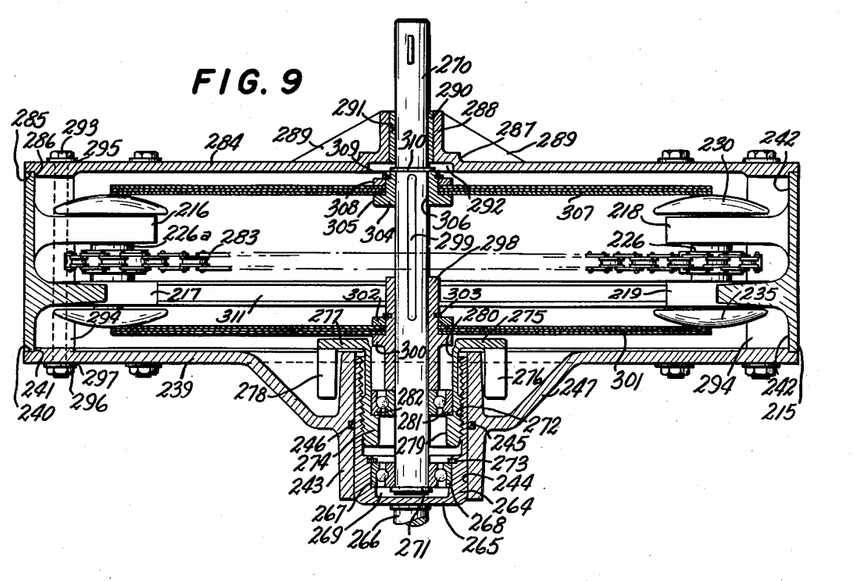
Figure 9 is a sectional view of a further modification of the invention wherein the driven shafts carry mushroom heads or ends and the flexible discs in contact therewith are laminated.
Figure 10:
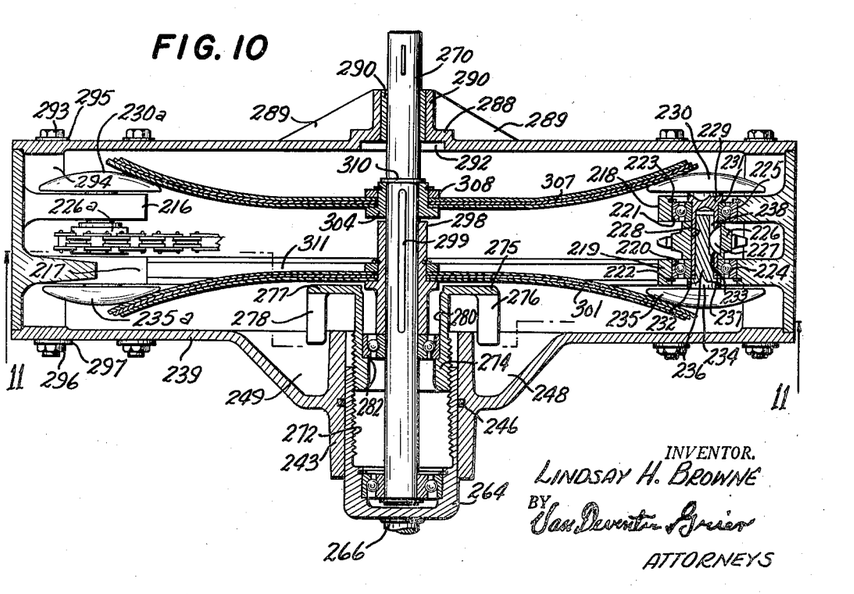
Figure 10 is a view similar to Figure 9 wherein the laminated discs have been flexed.

Referring to Figures 9, 10, 11, and 12, which illustrate a further embodiment of the invention, an annular ring member 215 has diametrically oppositely disposed pairs of lugs, for example, lugs 216 and 217, constituting one pair, and 218 and 219 constituting another pair. Formed in these lugs, as illustrated in Figure 10, are aligned holes 220 and 221 which have grooves formed therein to accommodate snap rings 222 and 234 respectively. Positioned in the hole 220, and abutting the snap ring 222, is a ball bearing 224, and positioned in the hole 221 and abutting the snap ring 223, is a ball bearing 225.

A sprocket 226 is positioned between the lugs 218 and 219, and this sprocket has a keyway 227 mounted in its bore 228. A shaft 229 having a mushroom head 230 has a shoulder 231 formed thereon and has a sleeve portion 232 due to the fact that a central passage for another shaft, to be presently described, has been formed therein. The sleeve 232 has a keyway 233 formed therein and this keyway is aligned with the key 227 as the shaft is pressed into the ball bearings 224 and 225. A second shaft 234 has a mushroom head 235 which is identical with the mushroom head 230 on the other shaft. The shaft 234 also has a portion 236 of reduced diameter which forms a working fit in the sleeve portion 232 of the other shaft, and thereby a shoulder 237 is formed between the main diameter of the shaft 234 and the portion 236. The portion 236 has a keyway 238 formed therein and this keyway is aligned with the key 227 and the shaft portion 236 is then pressed into the sleeve 232 thereby completing the assembly of a composite shaft rotatably mounted in ball bearings and having identical mushroom heads 230 and 235, and having a sprocket 226 keyed to it by means of the key 227 which engages the keyways 233, 238.

The lugs 216 and 217 have journaled in ball bearings therein an identical composite shaft having mushroom heads 230a and 235a, and having a sprocket 226a keyed thereto.

Figure 12:
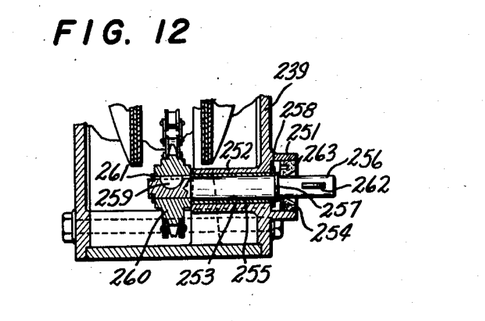
Figure 12 is a sectional elevation taken along the lines 12—12 of Figure 11, and showing the shaft driven by the prime mover.
Figure 13:
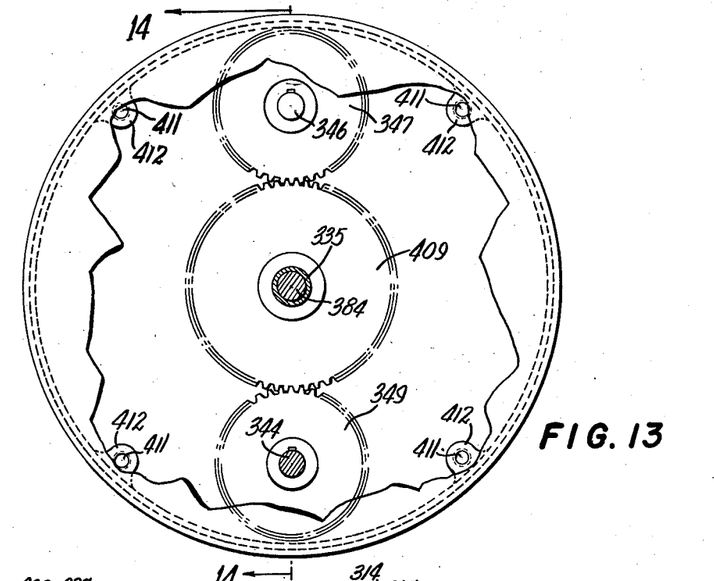
Figure 13 is an end view of a device including a further modification of the invention.

Secured to the annular ring member 215 is an end plate 239 which has a step 240 thereon to form a shoulder 241, and this shoulder fits the interior bore 242 of the annular portion 215 and accurately locates the end plate 239 thereon. The end plate 239 has formed integral therewith a boss 243 which has a bored passage 244 formed therein. Intermediate the ends of the passage 244 is an annular square groove 245 which accommodates a sealing gasket 246, to be presently described. The boss 243 is joined to the flat surface of the end plate 239 by means of a frusto-conical web 247, thus forming a depression which is formed into two compartments 248 and 249 by means of a web 250 extending thereacross. The end plate 239 also has formed integral therewith a boss 251 extending outwardly from the surface 239, and having an extension 252 extending inwardly from the surface 239. This boss has a bore 253 and a counterbore 254 from the outside communicating therewith. Within the bore 253 is a bearing bushing 255, and journaled in this bushing is a shaft 256 which has a snap ring 257 snapped into a groove formed therein and abutting a washer 258 which in turn abuts the right end of the bushing 255, as seen in Figure 12. The shaft 256 has near its inner end a keyway which accommodates a Woodruff key 259. A sprocket 260 has a keyway formed therein which engages the key 259 and this sprocket is retained on the shaft by means of a spring ring 261 snapped into a groove formed near the left end of the shaft 256. In the outer end of the shaft 256 is formed a keyway 262 which may be used to key any desired driving member on the shaft. Positioned in the counterbore 254 is an oilproof packing ring 263.

A piston-like member 264, having a head portion 265 to which is secured a stud shaft 266, forms a working fit in the bore 244 formed in the boss 243, and the sealing gasket forms with the outer surface of the piston member 264 an oil-tight seal.

Formed within the piston-like member 264 is a bore 267 to accommodate a ball bearing 268. Beneath the bore 267, as seen in Figure 9, is a clearance depression 269.

A shaft 270 has its lower end extending through the ball bearing 268 and has closely adjacent to said lower end a snap ring 271 which snaps into a corresponding groove formed in the shaft. The piston-like member has formed within the skirt portion thereof threads 272, and a snap ring 273 is positioned therein in contact with the upper face of the outer race of the ball bearing, as may be seen in Figure 9.

A sleeve-like member 274 has external threads formed thereon engaging the threads 272. Formed integral with the sleeve-like member 274 is a horizontal web 275 having a depending dog 276 formed thereon, and opposite the web is a second web 277 having a depending dog 278 formed integral therewith. As may be seen in Figure 11, the dogs 276 and 278 are offset so that they lie on the same side of the web 250, in fact, the lower edges of the dogs are slidable on the surface of the web 250 so that there is substantially no back lash. The sleeve-like member has an interior bore 279, and a counterbore 280 formed therein forms a shoulder 281 against which is forced the outer race of a ball bearing 282.

Figure 11:
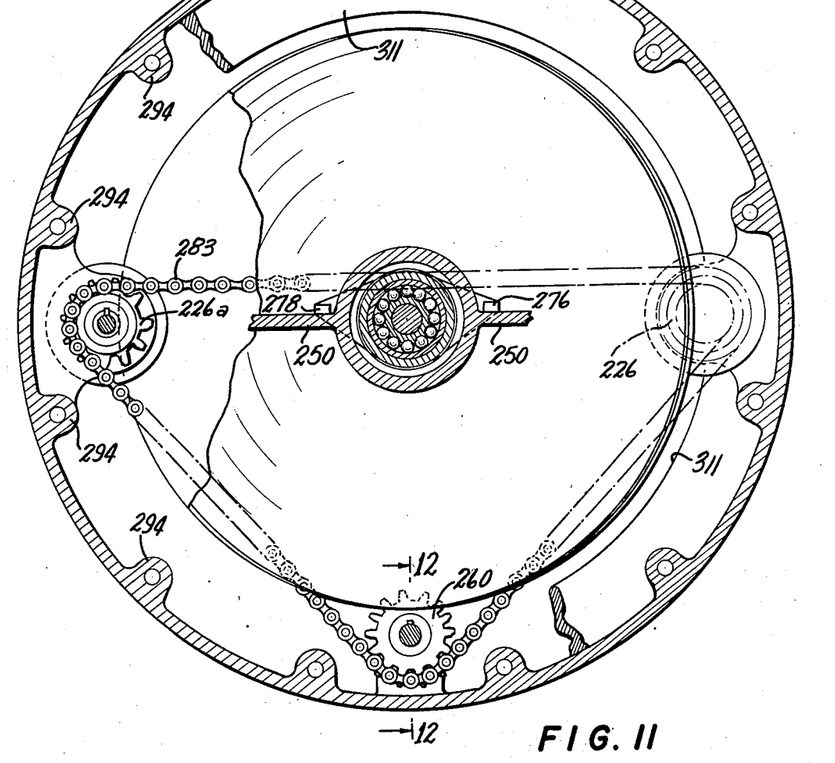
Figure 11 is a sectional plan view taken along the lines 11—11 of Figure 10.

The sprockets 226, 226a, and 260 are connected by a roller chain 283 so that when the shaft 256 is rotated by a prime mover the sprockets 226 and 226a are rotated in the same direction and at the same speed.

An end plate 284 has a step 285 thereon to form a shoulder 286, and this shoulder fits the interior bore 242 of the annular portion 215 and accurately locates the end plate 284 thereon. The end plate 284 has a central boss 287 which has an extension 288 of reduced diameter. Formed integral with the plate 284 and the bosses 287 and 288 are ribs 289 to lend rigidity. The bosses 287 and 288 have an interior bore 291 into which is pressed a bearing bushing 290. Formed in the end plate 284, below the boss 287, is a clearance cavity 292.

The end plate 239 and 284 are secured to the annular portion 215 by means of bolts 293 which extend through bosses 294 formed integral with the annular portion 215. Under the head of each bolt 293 is a washer 295, and threadedly engaging the other end of each bolt is a nut 296 with a washer 297 between it and the lower surface of the end plate 239, as seen in Figure 9.

The shaft 270 has keyed thereto a sleeve member 298 which has a keyway engaging a key 299 set into the shaft 270. Formed integral with the sleeve member 298 is a flange 300. A plurality (three in the embodiment illustrated in Figures 9 to 12) of flexible discs 301, are positioned on the sleeve member 298 against the shoulder or flange 300, and an annular ring 302, the diameter of which is substantially equal to the diameter of the flange 300, is pressed against the opposite face of the plurality of discs 301, and is secured in this relation by means of a snap ring 303 which engages a groove formed in the sleeve member 298. The lower end of the sleeve member 298, as seen in Figure 9, abuts the inner race of the ball bearing 282. A bushing 304 has an annular shoulder 305 formed integral therewith, and an interior bore 306, which has a keyway therein, not shown, which engages the key 299 in the shaft 270.

Positioned on the bushing 304 and against the shoulder 305, is a plurality of flexible discs 307 which are substantially identical with the discs 301. To retain the discs 307 against the shoulder 305, an annular ring 308 having an interior bore fitting the bushing 304, is pressed against the discs 307 and is retained thereon by means of a snap ring 309 which engages a groove for the purpose formed in the bushing 304.

The shaft 270 has a groove formed therein into which is snapped a snap ring 310. When the elements are in the positions shown in Figure 9, the points of contact between the discs and the mushroom heads 230, 230a, and 235, 235a, are substantially on the axes of the shafts carrying the mushroom heads and, consequently, there is no rotative urge imparted to the discs.

An annular web 311 is formed within the annular portion 215 and joins the bosses 217 and 219.

Assuming that a hand wheel, not shown, is mounted on and keyed to the stud shaft 266, this hand wheel may be rotated in a direction to cause the sleeve member 274 to move upwardly, as seen in Figures 9 or 10, thereby urging the sleeve member 298 carrying the discs 301, and the sleeve bushing 304 carrying the discs 307, toward each other. The reason the discs are moved toward each other is because of the fact that the snap ring 310 on the shaft 270 pulls the bushing 304 downwardly and at the same time the sleeve member 274, via the ball bearing 282, acts against the lower end of the sleeve member 298. The act of forcing the disc supports toward each other causes the discs to flex and as the discs flex the contact points between them and the mushroom heads advance outwardly from the axes of the mushroom heads, and the more these points of contact are displaced from the axes, the greater the rotative urge on the discs, thus, the speed of the shaft 270 can be regulated by turning the hand wheel on the stud shaft 266.

The positions of the discs shown in Figure 10, represent the maximum flexure of the discs because of the fact that the bushing 304 and the upper end of the sleeve 298 are practically in contact with each other.

Due to the fact that the discs are arranged in groups, each disc, in the example given, constituting three flexible members, and also due to the fact that the mushroom heads are substantially larger insofar as contact with their surfaces is concerned, substantial power is transmitted from the prime mover driven shaft 256 to the shaft 270, which is the output shaft of the device.

Figure 14:
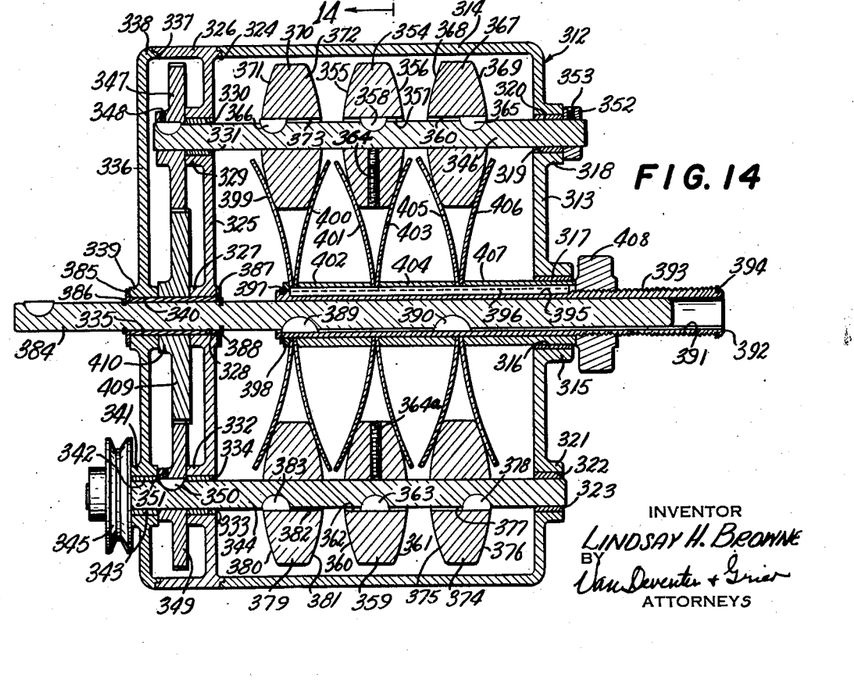
Figure 14 is a sectional elevation taken along the lines 14—14 of Figure 13, and showing how the discs are flexed.

Referring now to Figures 13, 14, 15, and 16, which show a further modification of the invention, a cup-like casing 312 has a disc-like end portion 313, and an annular portion 314 formed integral therewith. A central boss 315 is formed in the end portion 313 and has a bore 316 into which a bearing bushing 317 is forced. Spaced apart from the boss 315 is a boss 318 having a bore 319 therein to accommodate a bearing bushing 320. Also spaced apart from the boss 315 and oppositely disposed with respect to the boss 318, is a third boss 321 having a bore 322 therein to accommodate a bearing bushing 323. The rim of the annular portion 314 is counterbored at 324, and a disc-like plate 325 has an annular portion 326 formed integral therewith and the right end of this annular portion, as seen in Figure 14, is stepped to fit the counterbored portion 324. The plate 325 has a central boss 327 which has a bore 328 therein. The plate also has a boss 329 formed therein and in alignment with the boss 318, and this boss has a bore 330 into which is pressed a bearing bushing 331. The plate 325 has a third boss 332 in alignment with the boss 321, and this boss has a bore 333 therein to accommodate a bearing bushing 334.

The boss 327 has positioned in its bore 328 a bushing 335 which is substantially longer than the length axially of the boss 327. The annular portion 326 of the plate 325, has a counterbore 337 formed therein. The end plate 336 has an overhanging annular portion 338 which is stepped to fit the counterbore 337 and thus accurately locate the end plate thereon. The end plate has a central boss 339 which has an interior bore 340 through which the bushing 335 extends. The end plate 336 also has, in alignment with the bosses 321 and 332, a boss 341 having an interior bore 342 to accommodate a bearing bushing 343.

A shaft 344 is journaled in the bearings 323, 334, and 343. Secured to the left end of the shaft 344, as seen in Figure 14, is a pulley 345, which is adapted to be connected to a prime mover.

A shaft 346 is journaled in the bearings 320 and 331. This shaft has keyed thereto a gear 347 which abuts the left hand end of the bearing 331, and this gear is secured on the shaft by means of a set screw 348. A gear 349, substantially identical with the gear 347, is keyed to the shaft 344 by means of a key 350, and is secured thereon by means of a set screw 351. The axial length of the gear 349 and its hub is substantially equal to the space between the bearing 334 and the bearing 343, therefore, the shaft 344 has no end play. Now, in order to prevent end play in the shaft 346, a collar 352 is mounted on the right end of the shaft and is secured thereon by means of a set screw 353.

A gear 409 has a bore formed in its hub 410 which forms a working fit on the outer surface of the bushing 335 between the bosses 327 and 339. This gear freely rotates on the bushing 335 and it meshes with both the gear 347 and the gear 349 so that when the shaft 344 is rotated the shaft 346 is rotated in unison therewith.

The shaft 346 has mounted thereon a disc-like member 354 having opposite faces 355 and 356 curvilinear. The member 354 has a keyway 357 which engages a key 358 in the shaft 346. The member 354 has a threaded radial hole which is engaged by a set screw 364 by means of which it is fixedly secured on the shaft 346.

Carried on the shaft 344, in alignment with the member 354, is a second disc-like member 359 having opposed curvilinear surfaces 360 and 361. The member 359 has a keyway 362 therein and this keyway engages a key 363 carried by the shaft 344. A set screw 364a extends radially into the member 359 and is provided for fixedly securing it onto the shaft 344.

Spaced apart in the shaft 346 from the key 358, and to the right thereof, is a key 365 and spaced to the left of the key 358 is a key 366. Floatingly carried on the shaft 346 is a disc-like member 367 having curvilinear faces 368 and 369, and a keyway 360 in the member 367 slidingly engages the key 365. Another disc-like member 370 has opposed curvilinear faces 371 and 372. A keyway 373 formed in the member 370 slidingly engages the key 366 in the shaft 346.

The lower shaft 344 carries a disc-like member 374 which has opposed curvilinear faces 375 and 376. The member 374 has a keyway 377 which slidably engages a key 378 set into the shaft 344. A disc-like member 379 has opposed curvilinear faces 380 and 381, and also has a keyway 382 formed therein. This keyway slidably engages a key 383 formed in the shaft 344. A driven shaft 384 is journaled in the bearing 335 and has thereon a washer 385 which abuts the left end of the bearing 335 and is maintained in engagement therewith by means of a snap ring 386 snapped into a groove formed in the shaft. A second washer 387 on the shaft 384 abuts the right end of the bearing 335 and is secured in contact therewith by means of a snap ring 388 snapped into a corresponding groove formed in the shaft. The shaft 384 has set into it a key 389 and spaced apart therefrom is a second key 390 in alignment therewith. Positioned on the shaft 384 and having a keyway 391 therein engaging the keys 389 and/or 390, is a sleeve member 392. This sleeve member has external threads 393 formed therein and adjacent to the right end, as seen in Figure 14, the sleeve has a snap ring 394 snapped into a corresponding groove formed in the sleeve 392. The sleeve 392 also has a keyway 395 in which is mounted a key 396 extending axially of the sleeve. The sleeve on the left end has a snap ring 397 snapped into a groove therein and adjacent to the snap ring is a collar 398. Positioned on the sleeve 392 is a flexible disc 399 which contacts the curvilinear face 371 of the member 370, and the curvilinear face 380 of the member 371. Also mounted on the sleeve 392 is a disc 400 which contacts the curvilinear surface 372, of the member 370, and the curvilinear surface 381 of the member 371.

The discs 399 and 400 have notches (not shown), which engage the keyway 396. Positioned on the sleeve member 392 is a spacer tube 402 the left end (as seen in Figure 14), of which abuts the disc 400 and the right end of which is contacted by a flexible disc 401, which is similar to the discs 399 and 400. This disc contacts the curvilinear surface 355 of the member 354, and the curvilinear surface 360 of the member 359.

Mounted on the sleeve 392 is a flexible disc 403 which contacts the curvilinear surface 356 of the member 354, and the curvilinear surface 361 of the member 359. A sleeve 404, like the sleeve 402 is mounted on the sleeve 392 with its left end in contact with the disc 403. A flexible disc 405, mounted on the sleeve 392, contacts the right end of the sleeve 404 and is also in contact with the curvilinear surface 368 on the member 367, and the curvilinear surface 375 on the member 374. A flexible disc 406 mounted on the sleeve 392 contacts the curvilinear surface 369 of the member 367, and the curvilinear surface 376 of the member 374.

A sleeve 407 has its left end contacting the disc 406 and its right end is in contact with the hub of a knurled adjusting nut 408 which threadedly engages the threads 393 on the sleeve 392, and which is prevented from getting off of the sleeve 392 by the snap ring 394. In this arrangement it will be noted that there is no sleeve between the pairs of discs 399, 400, the discs 401, 403, and the discs 405, 406. In Figure 14 the discs are shown in their maximum flexed positions and, consequently, the shaft 384 is driven at its fastest speed due to the fact that the points of contact between the discs and the members with which they cooperate is well out on the curvilinear surfaces at points adjacent to the peripheries of the members. It will also be noted that the sleeve 407 is journaled in the bearing 317.

Figure 15:
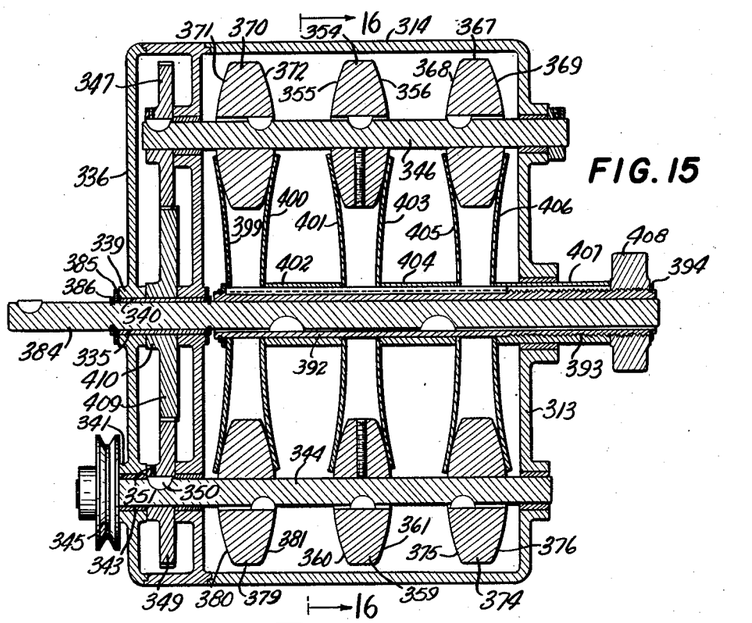
Figure 15 is a view similar to Figure 14, except that the flexure of the discs is reduced almost to a minimum.
Figure 16:
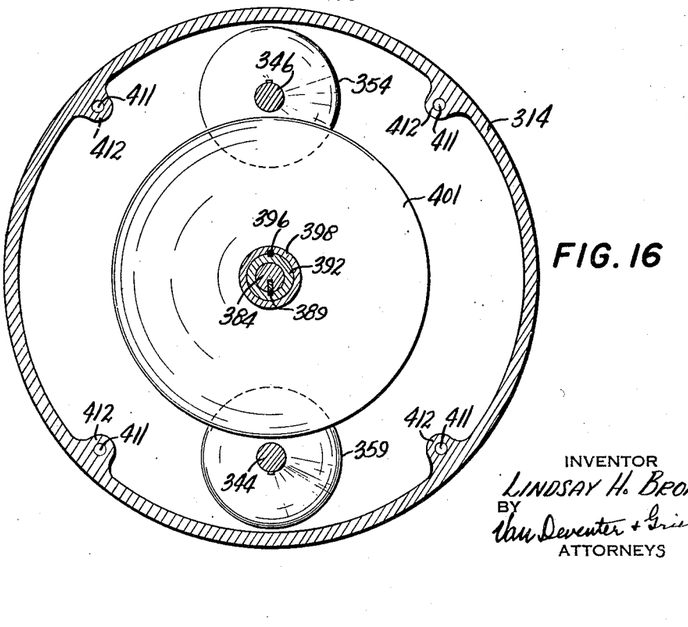
Figure 16 is a sectional view taken along the lines 16—16 of Figure 15.

In the arrangement shown in Figure 15, the thumb nut 408 has been adjusted to a position at the extreme end of the sleeve 392 and, therefore, the pairs of discs have been separated so that there is a substantial space between them along the surface of the sleeve 392 and, consequently, the discs are flexed a minimum and the points of contact between the discs and the members with which they cooperate have advanced substantially toward the axes of the shafts 344 and 346 which carry the driving members with the curvilinear surfaces, consequently, the rotation of the shaft 384 is at its lowest speed.

It would be pointed out that in the arrangement shown in Figures 13 to 16 inclusive, that the flexible discs cannot contact the curved surfaces on the axes of the shafts which rotate them due to the fact that the members 371, 354, 359, 367, and 374 are positioned on the shafts and, consequently, it is impossible to have the flexible discs contact the curved surfaces on the axes thereof.

The end plate 336, and the plate 325, are secured onto the upright member by means of screws engaging threaded holes 411 formed in bosses 412 in the annular portion 314.

Figure 17:
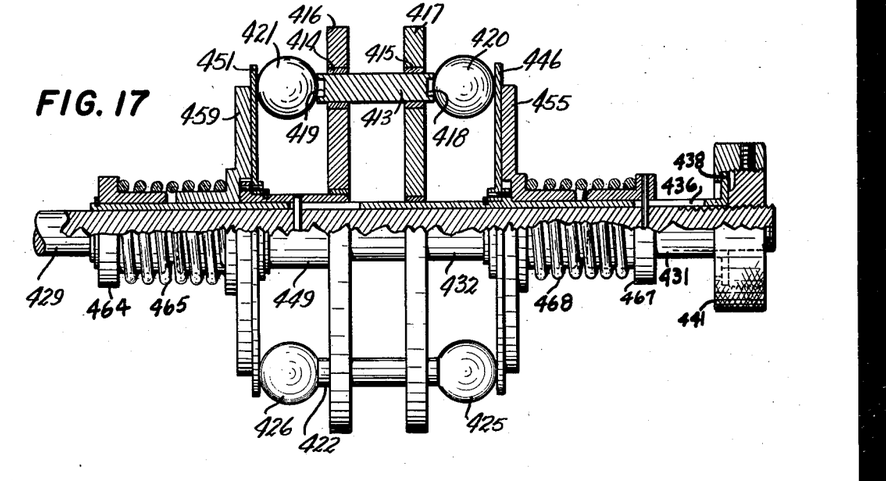
Figure 17 is an elevation partly in section and somewhat diagrammatic which shows my new and improved torque compensating means as applied to my new and improved drive, the positions of the discs in this figure being in contact with the balls in the neighborhood of the axes of the shafts carrying the balls.
Figure 18:
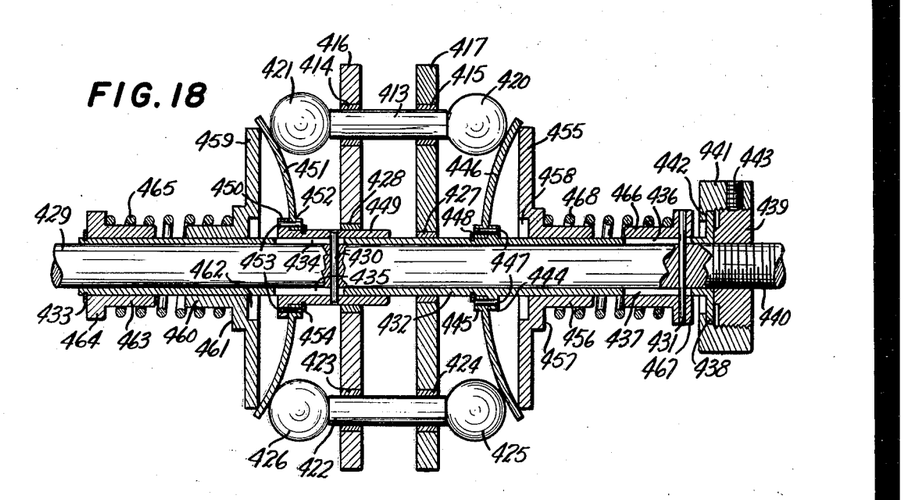
Figure 18 is a view similar to Figure 17 except that the discs have been flexed substantially.

In Figures 17 and 18 a modification is shown in which the torque is fairly constant even at the slowest speeds of the take-off shaft of the device.

A shaft 413 is journaled in bearings 414 and 415 carried in spaced plates 416 and 417 respectively. The shaft has a depression, or cup, 418, in one end thereof and a depression, or cup, 419 in the other end thereof, and positioned in these cup-like depressions are balls 420 and 421 respectively. A similar shaft 422 is journaled in bearings 423 and 424, in the plates 416 and 417 respectively, so that the axes of the shafts are substantially parallel. The shaft 422 is cupped in the same manner as the shaft 413 and carries in its cupped ends balls 425 and 426. Any suitable means may be provided for rotating the shafts 413 and 422 in the same direction and at the same rate of speed.

In Figures 17 and 18 the means for rotating the shafts in unison is omitted for the sake of clarity, but it will be understood that any of the methods shown in Figures 1 to 18, for example, may be employed for this purpose. The plate 417 has intermediate, and equi-distant from the bearings 415 and 424, and in alignment therewith, a bearing 427. The plate 416 has intermediate the bearings 414 and 423, and equi-distant therefrom, a bearing 428 which is in axial alignment with the bearing 427.

A shaft 429, which is the shaft to be driven at variable reduced speeds, has a cross pin 430 mounted therein and spaced apart therefrom a second cross pin 431. A sleeve 432 forms a working fit on the shaft 429 and has a snap ring 433 engaging a groove formed therein adjacent to the left end thereof, as seen in Figures 17 and 18. The sleeve has aligned elongated slots 434 and 435 through which the pin 430 extends and these slots are of such length that the shaft 429 may move endwise. The sleeve also has aligned elongated slots 436 and 437 through which the pin 431 extends. The sleeve 432 has formed integral with the right end thereof a radial flange 438 which abuts an externally and internally threaded disc 439. The internal threads of the disc 439 engage threads 440 formed on the shaft 429. Threadedly engaging the external threads on the disc 439 is an annular internally threaded member 441 which has formed integral therewith an inward radial flange 442 which overhangs the flange 438. The annular member 441 has a set screw 443 extending radially therethrough and this annular portion is adjusted on the disc-like portion 439 so that the hub of the disc-like portion engages the right face of the flange 438 on the sleeve 432, and the overhanging portion 442 engages the opposite face of the flange 438 with a working fit so that as the annular member is rotated in either direction the internal threads of the disc-like member engaging the threads 440 will cause the shaft 429 to move axially in either direction. The sleeve 432 has a flange portion 444 which forms a shoulder against which the hub 445 of a flexible disc 446 may contact. Axial pins 447 extending through the hub of the disc and through the flange 444 secure the disc in driving relation with the sleeve 432. In order to retain the disc in contact with the shoulder 444 a snap ring 448 is snapped into a corresponding groove formed in the sleeve 432. The flexible disc 446 is in contact with the balls 420 and 425.

A sleeve 449 has an interior bore which forms a working fit on the sleeve 432. The sleeve 449 has a shoulder 450 on the left end thereof as seen in Figure 18, and a flexible disc 451 which contacts the balls 421, 426, has a hub 452 which is keyed to the flange 450 by means of pins 453. The flexible disc is retained on the sleeve 449 by means of a snap ring 454. The sleeve 449 also has aligned holes therein to accommodate the pin 430 so that it may slide on the sleeve 432 and yet drive the shaft 429.

A disc member 455 has a hub 456 which is stepped to form a shoulder 457. This hub forms a working fit on the sleeve 432. An annular clearance space 458 is formed in the face of the disc member 455 to clear the flange 444 on the sleeve 432 so that the disc member 455 can cooperate with and back up the flexible disc 446.

A disc member 459 has a hub 460 which is stepped to form a shoulder 461. This hub forms a working fit on the sleeve 432. An annular clearance space 462 is formed in the face of the flange member 459 to clear the flange 450 on the sleeve 449 so that the disc member 459 can cooperate with and back up the flexible disc 451.

A sleeve member 463 has an interior bore which forms a working fit on the sleeve 432 and has formed integral therewith a flange 464. The sleeve 463 is positioned with the flange end 464 abutting the snap ring 433. A helical spring 465 embraces the sleeve 463 and the hub 460, and one end of the spring abuts the shoulder 461 on the rigid disc member 459, and the other end of the sleeve abuts the flange 464 so that the disc 459 is maintained in contact with the flexible disc 451.

A sleeve 466, having a flange 467 formed integral therewith, has its interior bore forming a working fit on the sleeve 432. The flange 467 has aligned holes therein to accommodate the pin 431, which also passes through a hole in the shaft 429. A helical spring 468 embraces the hub 456 and the sleeve 466, and has one end abutting the shoulder 457, and the other end abutting the flange 467 for urging the rigid disc member 455 into contact with the flexible disc 446.

In Figure 17, the flexible discs 446 and 451 are shown in their normal positions wherein they contact the balls 420, 425, and 421, 426 respectively, on the axes of the balls and the shafts 413 and 422, with the result that there is no motion imparted to the discs 446 and 451 and, consequently, the shaft 429 is not rotated. Now, when the adjusting nut assembly 439, 441, is rotated in a direction to move the shaft 429 axially to the right, the flexible disc 451 is urged via the pin 430 to the right, and also the sleeve 466 is urged to the right via the pin 431 with the result that the urge of spring 468 against the rigid disc 455 is reduced; at the same time, the adjusting nut assembly, via the flange 438 urges the sleeve 432 toward the left, and since the hub 444 is fixed on the sleeve, the flexible disc 446 is flexed. The flange 464 on the sleeve 463 is also moved toward the left with the result that the urge of spring 465 against the rigid disc 459 is reduced. In view of the fact that the adjusting nut assembly motivates both of the actions described above, the flexible discs automatically assume positions where their flexures are substantially equal, and the rigid disc members 455 and 459 assume positions where the urges of the springs 468 and 465 are substantially equal.

When the flexible discs are in the positions shown in Figure 17, the points of contact lie on the axes of the shafts 413 and 422, and the urges of the springs 468 and 465 via the rigid discs 455 and 459, and against the flexible discs 446 and 451 are a maximum so as to produce a maximum torque between the input shafts 413, 422, and the output shaft 429. As the discs are flexed, as described above, the points of contact with the balls advance angularly from the axes thereof and a rotative urge is impressed upon the discs and, consequently, upon the shaft 429.

Now, since the flexible discs 451 and 446 are backed up by rigid discs 459 and 455, respectively, and since the flexible discs are flexed, the urge of the cooperating springs is imparted by the rigid discs to the flexible discs at points adjacent to the axes of the balls due to the fact that the diameters of the rigid discs are substantially equal to the distance between the axes of the shafts 413 and 422 and, consequently, the torque imparted to the flexible discs by the balls is substantially greater than it is in other modifications described herein above.

As the adjusting nut 439, 441, is screwed further onto the threads 440 on the shaft, and the discs 451 and 446 flex to greater and greater degrees the urge of the springs 465 and 468 upon the rigid discs is reduced due to the fact that the space occupied by the springs is elongated and, consequently, the urge of the springs and, consequently, the resultant torque is reduced, as the flexible discs are more and more greatly flexed. In the position shown in Figure 18, they are shown at maximum flexure. The points of contact between the discs and the balls are displaced a maximum from the axes of the shafts 413 and 422 and, consequently, the shaft 429 is rotated at its greatest adjustable speed.

It will be noted, also, that when the nut 439, 441 is turned in the direction for the flexure of the discs 451 and 446, the compression of the springs 465 and 468 is increased, so that the torque remains substantially constant at the lower speeds corresponding to reduced flexure of the discs.

If desired, the springs 465 and 468 may be so designed as to provide a greater pressure between the discs and the balls when the discs are unflexed than is provided when the discs are flexed to their maximum extent, thereby obtaining greater torque at lower speeds. For instance, if spring 465 or 468 be designed to exert a pressure $p$ at its maximum compression (i. e. when the disc is unflexed), and the pressure of the disc against the balls in $p/2$ when the disc is at its maximum flexure, a decrease in speed corresponding to reduction in disc flexure (and increase in spring compression) is accompanied by a marked increase in torque.

Although I have herein shown and described the embodiment of the invention to illustrate a principle which I believe to be new and novel in the art, and several modifications of the first example, it is obvious that many changes may be made in the arrangements herein shown and described without departing from the scope of the invention as set forth in the enclosed claims.

What is claimed is:

1. In a speed reducer, a shaft adapted to be driven by a prime mover and having a socket formed in the end thereof, a member engaging said socket and having at least its outer surface curved, a second shaft spaced apart from said first shaft and carrying a flexible disc contacting said curved surface, means to flex said disc to vary the angular displacement of the point of contact between it and said surface with respect to the axis of said first shaft, thereby causing said second shaft to rotate at a desired speed substantially less than the speed of said first shaft.

2. In a speed reducer, a pair of input shafts spaced apart from each other and adapted to be driven in unison by a prime mover, a socket formed in the end of each shaft, a ball positioned in each of said sockets, an output shaft substantially equi-distant from said first shafts and carrying a flexible disc contacting said balls, the points of contact between said disc and said balls being cut by the axis of said input shaft, and means to flex said disc to offset said points of contact angularly with respect to the axes of said input shafts, whereby said output shaft is caused to rotate at a speed enormously less than the speeds of said input shafts.

3. In a speed reducer, a pair of input shafts spaced apart from each other and adapted to be driven in unison by a prime mover, a socket formed in the end of each shaft, balls of equal diameters positioned in said sockets, an output shaft equi-distant from said first shafts and carrying a flexible disc contacting said balls, the points of contact between said disc and said balls being on the axes of said input shafts, and adjustable means on said output shaft for flexing said disc to cause said points of contact to be offset angularly with respect to the axes of said input shafts, whereby the rotation of said output shaft is continuously smooth and yet may be varied at speeds substantially less than the speeds of said input shafts.

4. A speed reducer according to claim 2, in which said input shafts are provided with sockets in each end thereof, in which balls of equal diameters are positioned in each of said sockets, in which said output shaft has slidably keyed thereto an additional flexible disc contacting the balls in the other ends of said output shafts, whereby all of the points of contact between said disc and said balls are equi-distant from the axis of said output shaft, and in which means to flex said discs is carried on said output shaft and operable when said speed reducer is running, any errors in the dimensions of said balls being divided by four due to the four points of contact between said discs and said balls.

5. A speed reducer according to claim 4, in which the means for driving said input shafts in unison by a prime mover is comprised of a power shaft spaced apart from said power input shafts and carrying a pulley adapted to drive other pulleys having substantially equal diameters carried by said input shafts.

6. In a speed reducer, a support, a first shaft journaled therein, a pair of input shafts in alignment with and spaced substantially equi-distant from said first shaft, said input shafts having spheroidal surface means at each end thereof and movable therewith, a power shaft journaled in said support, spaced apart from said input shafts and being adapted to be driven by a prime mover, an idler shaft spaced apart from all said shafts and adjustably carried on said support, a pulley secured to said power shaft, other pulleys secured to said second shafts and substantially equal in diameter, a pulley carried by said idler shaft, a belt spanning all said pulleys and adapted to be tightened by adjusting said idler shaft on said support, a flexible disc keyed on said first shaft and contacting said surfaces on corresponding ends of said second shafts, a second disc slidably keyed on said first shaft and contacting said surfaces on the opposite ends of said input shafts, and means carried on said first shaft for forcing said discs toward each other thereby flexing them and causing the points of contact between said discs and the surfaces which they contact to be displaced angularly toward said first shaft, whereby the speed of said first shaft may be varied within the limits of the flexure of said discs.

7. In a speed reducer, a support, a pair of input shafts spaced apart from each other on said support, a power shaft journaled in said support adapted to be driven by a prime mover, an idler shaft adjustably carried on said support, aligned pulleys carried on said shafts, at least the pulleys on said input shafts being substantially the equal in diameter, a belt spanning all said pulleys and being adapted to be tightened by adjusting said idler shaft on said support, spheroidal surface means at each end of both of said input shafts and movable with said shafts, an output shaft journaled in said support and having its axis substantially equi-distant from the axes of said input shafts, a flexible disc fixedly secured to said output shaft and contacting the said spheroidal surface means at corresponding ends of said input shafts, a second disc movably keyed on said output shaft and contacting the spheroidal surface means at the opposite ends of said input shafts, and means carried on said output shaft for forcing said discs toward each other, thereby flexing them and causing the points of contact between said discs and said spheroidal surface means to move toward said output shaft and consequently to be angularly disposed with respect to the axes of said input shafts, whereby the speed of said output shaft is substantially reduced with respect to the speeds of said input shafts and may be varied within the limits of the flexure of said discs.

8. In a speed reducer, an output shaft, a pair of driven shafts equi-distant from said first shaft and carrying spheroidal surfaces on each end thereof rotating therewith, a pair of flexible discs carried on said output shaft and normally contacting said surfaces on the axes of said second mentioned shafts, and means carried by said first shaft for urging said discs toward each other, thereby flexing them and causing said points of contact to be displaced angularly from said axes, the speed of rotation of said first shaft being proportionate to the angular displacement of said points of contact.

9. In a speed reducer, a pair of input shafts spaced apart from each other, and means to drive them in unison, a member at one end of one of said shafts and movable therewith, a second member at the corresponding end at the other of said shafts and movable therewith, each of said members having a curved surface cut by the axis of the shaft with which it is movable, an output shaft between and substantially equi-distant from said input shafts and carrying a flexible disc contacting said surfaces, the points of contact between said disc and said surfaces normally lying substantially on said axes, and means to flex said disc to offset said points of contact angularly with respect to said axes, whereby said output shaft is caused to rotate at a speed greatly less than the speeds of rotation of said input shafts.

10. In a speed reducer, a pair of input shafts spaced apart from each other and means to drive them in unison, a member at each end of one of said shafts and movable therewith, a member at each end of the other of said shafts and movable therewith, said members having curved surfaces which are cut by the axes of the shafts with which they are movable, an output shaft equi-distant from said input shafts, a flexible disc keyed on said output shaft and contacting the curved surfaces of the members at corresponding ends of said input shafts, a second disc slidably keyed on said output shaft and contacting the surfaces of members at the opposite ends of said input shafts, and means carried on said output shaft for forcing said discs toward each other, thereby flexing them and causing the points of contact between them and said surfaces to be displaced angularly with respect to said axes to vary the speed of said output shaft within the limits of flexure of said discs.

11. In a speed reducer, a ball arranged to receive thrust along an axis therethrough, power means to rotate said ball on said axis, a shaft spaced apart from said axis, a flexible disc keyed to said shaft and normally contacting said ball at a point on said axis, and means to flex said disc to angularly displace said point of contact from said axis for causing said shaft to rotate.

12. In a speed reducer, a support, a pair of shafts journaled in said support in spaced relation to each other, each end of each of said shafts having a mushroom head, means on said support and driven by a prime mover for rotating said shafts in the same direction in unison, an output shaft journaled in said support equi-distant from said first mentioned shafts, a pair of discs mounted on said output shaft in spaced relation and movable therewith, one of said discs being in contact with the mushroom heads on corresponding ends of said first shafts at points on the axes of said shafts and the other of said discs being in contact with the mushroom heads on the opposite ends of said first mentioned shafts at points on said axes, and means on said support to force said discs toward each other for flexing them and causing said points of contact to be displaced angularly from said axes, thereby altering the speed of said output shaft within the limits of the flexure of said discs.

13. A speed reducer according to claim 12, in which the means for rotating said pair of shafts is comprised of a sprocket on each shaft of said pair, and a sprocket on said means, all three of said sprockets being spanned by a chain.

14. A speed reducer according to claim 10, in which the means to drive said input shafts in unison is comprised of pinions of equal diameter secured to said shafts, an idler gear meshing with said pinions, and a prime mover geared to one of said pinions.

15. In a speed reducer, a power shaft, an input shaft and means to drive the same, transmitting means between said shafts comprised of a spheroidal surface movable with and cut by the axis of said power shaft, a flexible disc-like member fixed on said output shaft contacting said spheroidal surface, and adapted to be flexed to vary the point of contact with said surface and angularly displace the same from said axis, a backing plate in contact with said flexible member, and means for axially exerting a predetermined urge upon said plate.

16. In a speed reducer having an output shaft carrying flexible discs contacting curvilinear surfaces carried on both ends of each of a pair of input shafts equidistant from said first shaft and adapted to be driven in unison by a prime mover, each of said flexible discs being in contact with and backed up by a rigid disc urged into contact therewith by spring means, the method of changing the speed of said output shaft and the torque of said discs, which consists of forcing said discs toward each other and consequently flexing them and displacing the points of contact between them and said surfaces angularly with respect to the axes of said input shafts, and reducing the urge of said spring means on said rigid discs as said flexible discs are flexed.

17. In a speed reducer, an output shaft, an input shaft and means to drive the same, power transmitting means between said shafts including spheroidal surface means movable with and cut by the axis of said output shaft, a flexible disc-like member fixed on said output shaft and contacting said surface, said disc being adapted to be flexed to vary and angularly displace its point of contact with said surface, a rigid disc member in contact with said flexible member, means for axially exerting a predetermined urge upon said rigid plate when said point of contact is displaced a minimum, and common means on said output shaft for both flexing said flexible member and for reducing said urge upon said rigid member.

18. In a speed reducer, an input shaft and means to drive the same, an output shaft, means movable with said input shaft and having a spheroidal surface cut by the axis of said input shaft, a disc-like member carried by said output shaft in contact with said surface, means to move said disc axially in order to flex the same and angularly displace the point of contact between it and said surface, a backing plate on said output shaft in contact with said disc-like member, and means contacting said plate and urging the same into contact with said disc-like member for maintaining a predetermined pressure between said disc and said surface when said disc is at minimum flexure, thereby creating a predetermined torque, and means for reducing said urge retrograde as the flexure of said disc is increased.

19. In a speed reducer, an output shaft, an input shaft and means to drive the same, power transmitting means between said shafts including spheroidal surface means movable with and cut by the axis of said input shaft, a flexible disc-like member fixed on said output shaft and contacting said surface, said disc being adapted to be flexed by moving said output shaft axially to vary and angularly displace its point of contact with said surface, a rigid disc member in contact with said flexible member, spring means embracing said shaft and exerting a predetermined urge upon said rigid plate when said point of contact is displaced a minimum, rigid backing means for said spring, and common means on said output shaft for moving said disc and said backing means in opposite directions, thereby increasing the flexure of said flexible member and reducing the urge of said spring upon said rigid member.

20. In a speed reducer, an output shaft, an input shaft and means to drive the same, curved surface means on each end of said input shaft, both said surface means being movable with and cut by the axis of said input shaft, a first flexible disc-like member keyed to said output shaft and contacting the curved surface means on one end of said input shaft, a second flexible disc-like member keyed to shaft means embracing said output shaft and contacting said curved surface means on the other end of said input shaft, said discs being adapted to be flexed by being moved axially to vary and angularly displace their respective points of contact with said surface means, a first rigid disc member in contact with said first flexible member, a first spring means embracing said shaft and exerting a predetermined urge upon said first rigid disc member when the point of contact of said first flexible member with its cooperative surface is displaced a minimum, a first rigid backing means for said first spring secured to said shaft means, a second rigid disc member in contact with said second flexible member, a second spring means embracing said shaft and exerting a predetermined urge upon said second rigid disc member when the point of contact of said second flexible member with its cooperative surface is displaced a minimum, a second rigid backing means for said second spring keyed to said shaft, means for moving said second flexible member and decreasing the urge of said first spring upon said first rigid member, and means for moving said shaft in the opposite direction for simultaneously increasing the flexure of said first flexible member and reducing the urge of said second spring means upon said second rigid member.

21. In a speed reducer, input and output members rotatable about different axes and having surfaces in frictional driving engagement with one another at positions variable with respect to the radial distances from the respective axes, at least one of said surfaces being a surface of revolution, mechanism for flexing one of said members to vary said radial distances by moving the location of frictional engagement on said surface of revolution, means for exerting a force upon the last mentioned member to press the latter against the other member, and means operable concomitantly with said flexing mechanism for varying the pressure applied by said force-exerting means.

22. In a speed reducer, an input member rotatable about an axis, an output member having connected thereto a flexible element adapted for frictional engagement with said input member, means for flexing said flexible element for shifting the location of said frictional engagement with respect to said axis, means for exerting a force upon said flexible element to press the latter against said input member, and means operable concomitantly with said flexing means for varying the pressure applied by said force exerting means.

23. In a speed reducer, an input member rotatable about an axis, an output member having connected thereto a flexible element adapted for frictional engagement with said input member, means for flexing said flexible element for shifting the location of said frictional engagement with respect to said axis, means for exerting a force upon said flexible element to press the latter against said input member, and means operable concomitantly with said flexing means for reducing the pressure applied by said force-exerting means as the flexure of said flexible element is increased.

24. In a speed reducer, an input member rotatable about an axis, an output member having connected thereto a flexible element adapted for frictional engagement with said input member, means for flexing said flexible element for shifting the location of said frictional engagement with respect to said axis, means for exerting a force upon said flexible element to press the latter against said input member, and means operable concomitantly with said flexing means for increasing the pressure applied by said force-exerting means as the flexure of said flexible element is reduced.

LINDSAY H. BROWNE.

REFERENCES CITED

The following references are of record in the file of this patent:

UNITED STATES PATENTS

| Number | Name | Date |
|---|---|---|
| 1,487,373 | Deakin | Mar. 18, 1924 |
| 1,963,599 | Tscherne | June 19, 1940 |

FOREIGN PATENTS

| Number | Country | Date |
|---|---|---|
| 260,732 | Great Britain | Nov. 11, 1926 |
| 379,893 | Italy | Apr. 12, 1940 |
| 613,009 | France | Aug. 13, 1926 |